United States Patent [19]
Holden

[11] 3,945,145
[45] Mar. 23, 1976

[54] BAIT HOLDING FISHING HOOK ASSEMBLY

[76] Inventor: Arnold I. Holden, 6490 Myrtle Ave., Long Beach, Calif. 90805

[22] Filed: Mar. 20, 1975

[21] Appl. No.: 560,183

[52] U.S. Cl. ............................................. 43/44.6
[51] Int. Cl.[2] ........................................ A01K 83/06
[58] Field of Search ......... 43/44.2, 44.4, 44.6, 44.8; 17/70, 75, 76

[56] References Cited
UNITED STATES PATENTS

| | | | |
|---|---|---|---|
| 580,915 | 4/1897 | Welch | 43/44.2 |
| 1,324,109 | 12/1919 | Dutes | 43/44.6 |
| 2,659,996 | 11/1953 | Hegler, Jr. | 43/44.6 |
| 2,754,613 | 7/1956 | Rogers et al. | 43/44.6 |
| 2,940,208 | 6/1960 | Oswald | 43/44.6 |
| 3,156,066 | 11/1964 | Munyer | 43/44.4 |

FOREIGN PATENTS OR APPLICATIONS
787,080   6/1968   Canada ............................. 43/44.6

*Primary Examiner*—Warner H. Camp
*Attorney, Agent, or Firm*—Charles A. Goodall

[57] ABSTRACT

A bait holding assembly having in combination a swivel means attached to a clip which is in turn attached to a bait clamping means. One or more relatively short fishing lines are attached to the clip and carry fish hooks that are embedded in the bait when clamped. The bait holding assembly is particularly well suited for use with opened bivalves such as muscles and the like as bait, said bivalve being clamped in said clamping means and said hooks or hook being embedded in the flesh of said bivalve. The clamping means is so constructed as to maintain the bivalve in a fully open position.

4 Claims, 6 Drawing Figures

BAIT HOLDING FISHING HOOK ASSEMBLY

BACKGROUND OF THE INVENTION

This invention relates to bait holders for use in fishing and more particularly for use where relatively large bait sections and bivalves such as muscles and the like are used. Present methods of holding bait involve piercing the bait with a hook or wrapping the line to which a hook is attached around the bait. It has been found that when using these methods bait may be easily pulled from the hooks. Furthermore, when casting the bait often becomes dislodged. These problems are more critical when fishing with bivalves such as muscles and clams. The present invention overcomes these problems in that the opened shell of the bivalve is securely clamped and the hooks, which form part of the assembly, are then embedded in the flesh of the bait. With the bait secured in this manner, there is less probability of loss of the bait during the fishing operation. The Hearne U.S. Pat. No. 3,677,150 has approached the problem by clamping the bait to the hook shank. This method does not afford the flexibility of the present invention and the size and type of bait and the size of the hook may dictate against the use of the Hearne invention in many instances. The present invention is not limited in any respect to bait size, size of the hook or number of hooks to be used as are other methods currently in use.

SUMMARY OF THE INVENTION

This invention relates to bait holding assemblies and particularly to an assembly wherein bait may be clamped in place with a clamping means and a hook or a plurality of hooks may then be embedded in the bait. It is particularly well suited for bait such as bivalves including muscles, clams and the like the shells of which may be clamped in the clamping means after opening the shell. This affords a means of fishing with this type of bait while the bivalve is still living or fresh. The invention embodies in combination a swivel means to which is attached a clip means openable at both ends thereof. The clip means is attached to a bait clamping means, and one or more relatively short fishing lines are attached to the clip means and carry fishing hooks which are embedded in the bait.

The principal object of the invention is thus to provide a bait holding fishing hook assembly wherein the bait may be clamped and held independently of the fishing hooks, and said hooks may then be embedded into the clamped bait, said assembly being particularly useful in the case of bivalve bait.

Another object of the invention is to provide a bait holding and fishing hook assembly wherein the clamping means is constructed so as to exert upon the opened bivalve a uniform pressure of substantial magnitude along the entire width of the clamping jaws. The clamping pressure is primarily applied at the leading edges of the clamping jaws which are biased toward each other by a clamping spring member which serves both to interconnect the jaws and apply the clamping pressure. The jaws are exteriorly convexly rounded and spaced when closed at the side regions thereof, so that the interior of the holder when the jaws are opened is able to accommodate a substantial thickness of the bivalve while maintaining pressure thereon primarily at the leading edges of the jaws. To improve the bait holder as a fishing lure, the clamping means is preferably brightly colored.

Other objects of the invention will become apparent from the following specification described in particular reference to the application drawings.

DESCRIPTION OF THE PREFERRED EMBODIMENT

Figure 1:
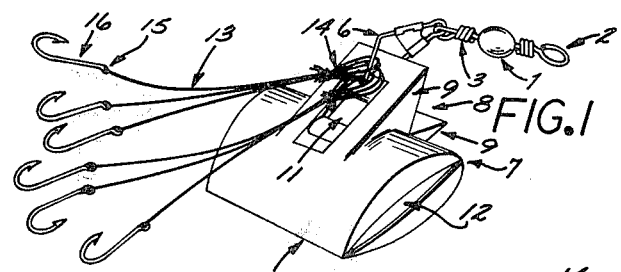
FIG. 1 is a perspective view of a bait holding fishing hook assembly showing the swivel means, a clip means, a bait clamping means and a plurality of fishing lines each of which has attached to the opposite end thereof a fish hook.
Figure 2:
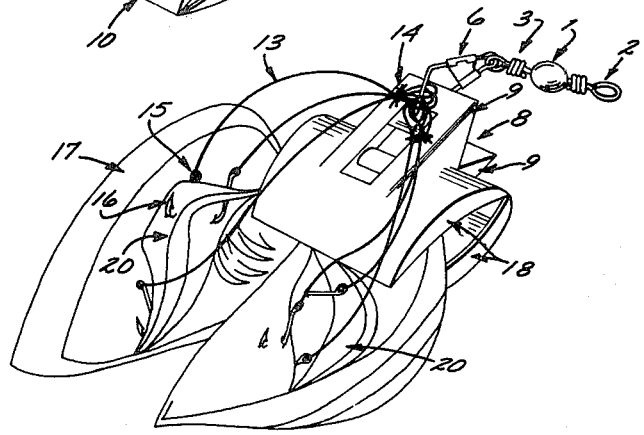
FIG. 2 is a perspective view of the bait holding fishing hook assembly shown in FIG. 1 wherein a bivalve such as a muscle is clamped in position in said clamping means and further showing the fishing hooks embedded in the flesh of said bivalve.
Figure 3:
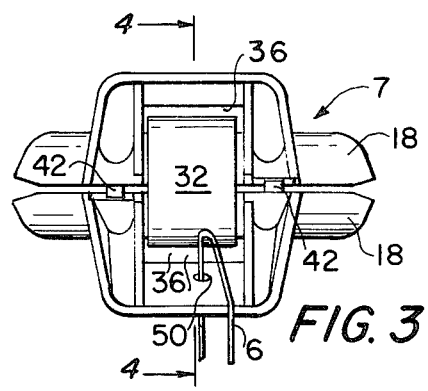
FIG. 3 is a rear view of the clamping means and clip.

Referring to FIGS. 1 and 2 the bait holding assembly comprises in combination a swivel means 1 of the type used for fishing tackle having a connecting end 2 for the fishing line and a connecting end 3 for the tackle. A clip means 6 is connected at the front end thereof to the end 3 of the swivel means and at its other end to the bait holding clamping means 7. The clamping means is shown in greater detail in FIGS. 3–6 specific reference to which will be presently made. The clamping means comprises a clamping end generally indicated at 10 and actuating fingers or projections generally indicated at 9 which are spaced to define an opening 8 therebetween when the clamping means is in its closed, FIG. 1 position. Each finger or projection has a generally rectangular shaped opening.

A plurality of relatively short fishing lines 13 form part of the assembly, with the lines 13 having loop ends 14 attached to the clip 6 and opposite ends 15 to which a fishing hook 16 is connected. In using the bait holding assembly of this invention, the connecting end 2 is attached to a fishing line, the bait clamping means 7 is opened and an opened bivalve 17 is inserted between the clamping jaws 18 of the clamping means 7, and the spring loaded clamp is allowed to close on the opened bivalve. The fishing hooks 16 are then embedded into the flesh 20 of the bivalve bait.

Figure 4:
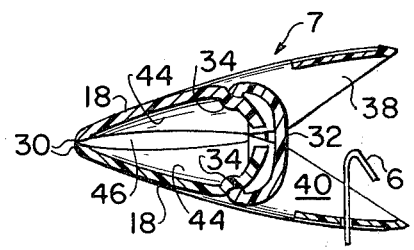
FIG. 4 is a sectional view taken on line 4—4 of FIG. 3.
Figure 5:
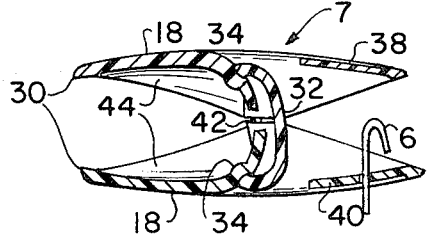
FIG. 5 is a sectional view similar to FIG. 3, showing the clamping jaws in an open position to receive the bait.
Figure 6:
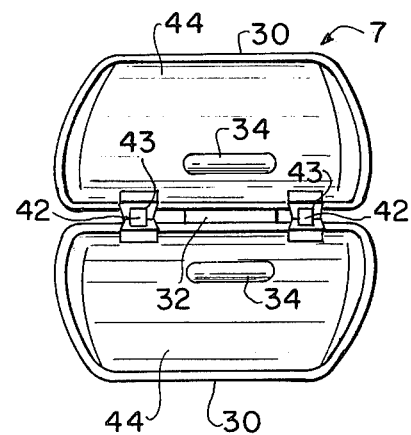
FIG. 6 is a front view of the clamping means, with the jaws being open.

The clamping means 7 is shown in greater detail in FIGS. 3–6, and comprises clamping jaws 18 above referred to and illustrated in FIGS. 1 and 2. As shown in FIGS. 4 and 5, the jaws 18 are exteriorly convexly curved, with the front, leading edges 30 of the jaws being in tight engagement when the clamp is closed as shown in FIG. 4. The clamping force is applied by means of a generally C-shaped spring clamp member 32 the free ends of which engage in dimples or recesses commonly designated at 34 formed in the exterior surfaces of the jaws 18. The width of the spring clamp 32 relative to the width of the entire clamp can be seen in FIGS. 3 and 6. The ends of the clamp extend through openings 36 formed in the projections 38 and 40 of the clamp means, which projections are integrally formed with each of the clamping jaws 18.

The jaws 18 are hinged together by means of pins commonly designated at 42 integrally formed with the lower movable jaw 18, which pins engage in sockets or recesses commonly designated at 43 formed in the adjacent surface of the upper jaw 18. The pins and sockets are preferably molded into the jaws during the manufacture thereof, with the jaws moving relative to each other upon an axis through the pins.

As noted, the spring clamp 32 biases the jaws to their FIG. 4 position in which the leading edges 30 tightly engage each other. To insert the bait, such as bivalve 17 shown in FIG. 2, in the clamping means, the projections 38 and 40 are grasped by the user and moved toward each other against the bias of the spring clamp 32, thereby opening the movable jaw as shown in FIG. 5. The bait can then be inserted in the clamp as shown in FIG. 2, with the projections 38 and 40 being thereafter released whereby the spring clamp biases the clamping jaws into tight engagement with the bivalve. As seen in FIG. 5, the spring clamp 32 is distorted during the opening movement of the jaws thereby increasing the clamping pressure on the jaws when the projections are released.

As seen in FIGS. 1 and 4, the side walls 44 of each jaw 18 are constructed so as to define a gap 46 therebetween when the jaws are closed. This gap, together with the convex construction of the jaws serves to define a relatively large area for receiving the bivalve when the jaws 18 are opened. The gap 46 also permits the clamping pressure of the jaws on the bivalve to be confined primarily to the leading edges 30 of the jaws rather than the edges of the side walls 44. In this manner, maximum clamping force is effected.

The substantial lateral width of the clamping jaws 18 is of course of substantial importance in accordance with the present invention. As can be seen in FIG. 2, a substantial portion of the opened bivalve can be clamped by the leading edges 30 of the clamping means thereby maintaining the bivalve in its open position. This feature is of substantial significance during casting operations where prior art bait holding means have not been capable of maintaining the bivalve in its fully open position during casting. After the bivalve has been clamped in place, the hooks 16 as above described are embedded through the flesh of the bivalve as shown in FIG. 2. The lines 13 which carry the hooks 16 are conveniently carried by the clip 6 which extends through an opening 50 therefor formed in the projection 40.

I claim:

1. A bait holding assembly comprising in combination, a swivel means having a line connecting end and a tackle connecting end; a clip means having a front end and a rearward end, said front end thereof being connected to said swivel means; a bait holding clamping means comprising a pair of finger actuated clamping jaws interconnected by a spring biasing the leading edges of said jaws into clamping engagement, the opposite ends of said jaws being spaced for subsequent finger manipulation toward each other against the bias of said spring for spacing said forward ends for inserting or removing the bait; at least one of said jaws having an opening in said opposite end thereof receiving the rearward end of said clip means; said clamping jaws being of a width to clamp onto a substantial portion of an opened bivalve bait piece for holding and maintaining said bivalve in such opened position, the interior walls of said clamping jaws being concavely curved and including side wall portions which extend generally perpendicular to said curved walls and which are spaced to form a gap when the clamping jaws are closed under the bias of said spring, the concavely curved walls and said sidewall portions defining a generally enclosed area for receiving said bivalve, with substantially the entire clamping force of said jaws being transmitted to the bait through said leading edges, and a plurality of relatively short fishing lines having loop ends attached to said clip means and a hook end each of which has attached thereto a fishing hook which can be embedded in said bivalve bait.

2. The bait holding assembly of claim 1 wherein said opposite ends of said jaws comprise projections which are normally spaced and which can be grasped by the user and forced toward each other against the bias of said spring for separating the clamping jaws for inserting or removing the bait, the width of said jaws being such that they extend substantially on both sides of said projections thereby providing a wide clamping surface for clamping the bait.

3. The bait holding assembly of claim 2 wherein said spring is generally C-shaped and said jaws are formed with recesses in the exterior surface thereof to receive the free ends of said spring, said projections being formed with openings through which said free ends of said spring extend.

4. The bait holding assembly of claim 3 wherein said jaws are interconnected by means of pins formed on one of said jaws and openings for said pins formed in the other of said jaws, said jaws when opened pivoting about an axis through said pin connections.

* * * * *